(12) United States Patent
Shoda et al.

(10) Patent No.: US 7,416,216 B2
(45) Date of Patent: Aug. 26, 2008

(54) TELESCOPIC SHAFT FOR VEHICLE STEERING

(75) Inventors: Akihiro Shoda, Gunma-ken (JP); Yasuhisa Yamada, Gunma-ken (JP)

(73) Assignee: NSK Ltd., Tokyo (JP)

( * ) Notice: Subject to any disclaimer, the term of this patent is extended or adjusted under 35 U.S.C. 154(b) by 195 days.

(21) Appl. No.: 10/536,359

(22) PCT Filed: Nov. 28, 2003

(86) PCT No.: PCT/JP03/15222

§ 371 (c)(1), (2), (4) Date: May 26, 2005

(87) PCT Pub. No.: WO2004/050453

PCT Pub. Date: Jun. 17, 2004

(65) Prior Publication Data

US 2006/0039747 A1 Feb. 23, 2006

(30) Foreign Application Priority Data

Nov. 29, 2002 (JP) .............................. 2002-348214

(51) Int. Cl.
*B62D 1/185* (2006.01)

(52) U.S. Cl. ...................... 280/775; 403/109.1; 384/47; 74/493; 464/167

(58) Field of Classification Search ................... 384/49; 64/21; 464/167; 280/775; 74/497, 493
See application file for complete search history.

(56) References Cited

U.S. PATENT DOCUMENTS

| | | | |
|---|---|---|---|
| 2,607,257 A | 8/1952 | Hadden | |
| 3,169,407 A * | 2/1965 | Newell | 74/424.9 |
| 3,356,424 A | 12/1967 | Edwards | |
| 3,392,599 A | 7/1968 | White et al. | |
| 3,444,753 A | 5/1969 | Runkle | |
| 3,604,285 A | 9/1971 | Erland et al. | |
| 3,879,093 A | 4/1975 | Betrix | |
| 4,012,925 A * | 3/1977 | Krude | 464/146 |

(Continued)

FOREIGN PATENT DOCUMENTS

AU 234387 12/1959

(Continued)

*Primary Examiner*—Kevin Hurley
*Assistant Examiner*—Karen J. Amores
(74) *Attorney, Agent, or Firm*—Miles & Stockbridge P.C.

(57) ABSTRACT

According to the present invention, a rolling element 7 for rotating upon relative movement of both shafts 1 and 2 in the axial direction is disposed between three pairs of axial grooves 3 and 5 which are formed on the outer peripheral surface of the male shaft 1 and on the inner peripheral surface of the female shaft 2, respectively, a raceway surface element 9 which is in contact with the rolling element 7 and an elastic member 10 for pressurizing the rolling element 7 against the male shaft 1 and the female shaft 2 through the raceway surface element 9 are interposed between the axial groove 3 on the male shaft side 1 and the rolling element 7, and a sliding member 8 for slidably moving upon relative movement of the both shafts 1 and 2 in the axial direction is disposed between another three pairs of axial grooves 4 and 6 which are formed on the outer peripheral surface of the male shaft 1 and on the inner peripheral surface of the female shaft 2, respectively.

6 Claims, 6 Drawing Sheets

U.S. PATENT DOCUMENTS

| | | | |
|---|---|---|---|
| 4,280,341 A * | 7/1981 | Krude | 464/167 |
| 4,357,137 A | 11/1982 | Brown | |
| 4,384,861 A | 5/1983 | Lange et al. | |
| 4,500,141 A | 2/1985 | Daugherty | |
| 4,509,386 A * | 4/1985 | Kimberlin | 74/492 |
| 4,667,530 A | 5/1987 | Mettler et al. | |
| 4,705,491 A * | 11/1987 | Andersson | 464/167 |
| 5,184,978 A * | 2/1993 | Fillmore et al. | 464/111 |
| 5,226,853 A | 7/1993 | Courgeon | |
| 5,235,734 A | 8/1993 | DuRocher | |
| 5,460,574 A | 10/1995 | Hobaugh | |
| 5,542,343 A | 8/1996 | Martin | |
| 5,709,605 A | 1/1998 | Riefe et al. | |
| 5,899,811 A | 5/1999 | Kishibuchi et al. | |
| 6,035,740 A | 3/2000 | Budaker et al. | |
| 6,174,239 B1 * | 1/2001 | Guimbretiere | 464/111 |
| 6,279,953 B1 | 8/2001 | Cartwright | |
| 6,293,872 B1 * | 9/2001 | Ganser | 464/167 |
| 6,343,993 B1 * | 2/2002 | Duval et al. | 464/167 |
| 6,474,868 B2 * | 11/2002 | Geyer et al. | 384/49 |
| 6,510,756 B2 | 1/2003 | Aota | |
| 6,533,459 B2 * | 3/2003 | Podhajecki et al. | 384/57 |
| 6,557,433 B1 | 5/2003 | Castellon | |
| 6,620,050 B2 | 9/2003 | Park | |
| 6,729,648 B2 | 5/2004 | Ulintz | |
| 6,733,039 B2 | 5/2004 | Honda et al. | |
| 6,755,746 B2 | 6/2004 | Barnley et al. | |
| 6,761,503 B2 * | 7/2004 | Breese | 403/359.5 |
| 6,893,353 B2 * | 5/2005 | Dutkiewicz et al. | 464/167 |
| 6,902,487 B2 * | 6/2005 | Welschof | 464/167 |
| 6,921,338 B2 * | 7/2005 | Cermak et al. | 464/167 |
| 6,948,401 B2 | 9/2005 | Zernickel et al. | |
| 7,147,375 B2 * | 12/2006 | Zernickel et al. | 384/49 |
| 7,226,360 B2 * | 6/2007 | Lyon et al. | 464/146 |
| 2001/0006564 A1 * | 7/2001 | Geyer et al. | 384/49 |
| 2002/0177485 A1 * | 11/2002 | Cermak et al. | 464/167 |
| 2003/0073503 A1 * | 4/2003 | Perrow | 464/167 |
| 2004/0245759 A1 | 12/2004 | Yamada et al. | |
| 2005/0022623 A1 * | 2/2005 | Reiche et al. | 74/493 |
| 2005/0070365 A1 | 3/2005 | Riefe et al. | |
| 2005/0104354 A1 | 5/2005 | Yamada et al. | |
| 2005/0257639 A1 | 11/2005 | Yamada | |
| 2006/0012161 A1 | 1/2006 | Yamada | |
| 2006/0039747 A1 * | 2/2006 | Shoda et al. | 403/109.1 |
| 2006/0053934 A1 * | 3/2006 | Bahr et al. | 74/492 |
| 2006/0060022 A1 | 3/2006 | Yamada | |
| 2006/0068924 A1 | 3/2006 | Yamada | |
| 2006/0082120 A1 | 4/2006 | Taniguchi et al. | |
| 2006/0156855 A1 | 7/2006 | Yukawa et al. | |
| 2006/0162989 A1 | 7/2006 | Yamada | |
| 2006/0181069 A1 | 8/2006 | Yamada | |
| 2006/0252559 A1 | 11/2006 | Yamada | |
| 2007/0157754 A1 * | 7/2007 | Yamada | 74/493 |
| 2007/0273137 A1 | 11/2007 | Yamada et al. | |

FOREIGN PATENT DOCUMENTS

| | | |
|---|---|---|
| DE | 37 30 393 | 3/1989 |
| DE | 19538303 | 4/1997 |
| DE | 19820291 | 11/1999 |
| DE | 19824477 | 12/1999 |
| DE | 19905350 | 8/2000 |
| DE | 10202899 | 8/2002 |
| DE | 20212294 | 10/2003 |
| EP | 0281723 | 9/1988 |
| EP | 1065397 | 1/2001 |
| EP | 1 078 843 | 2/2001 |
| EP | 1106851 | 6/2001 |
| EP | 1 167 790 | 1/2002 |
| EP | 1247719 | 10/2002 |
| EP | 1512607 | 3/2005 |
| EP | 1547903 | 6/2005 |
| EP | 1 557 338 A1 | 7/2005 |
| EP | 1568569 | 8/2005 |
| EP | 1588921 | 10/2005 |
| ES | 2161127 | 11/2001 |
| FR | 2795787 | 1/2001 |
| GB | 2344084 | 5/2000 |
| GB | 2373551 | 9/2002 |
| JP | 45-19207 | 8/1970 |
| JP | 62-244758 | 10/1987 |
| JP | UM-1-145670 | 10/1989 |
| JP | UM-4-43522 | 4/1992 |
| JP | 29-16708 | 6/1992 |
| JP | U.M. 4-123775 | 11/1992 |
| JP | 2000-38142 | 2/2000 |
| JP | 2000-159042 | 6/2000 |
| JP | 2000-205288 | 7/2000 |
| JP | 2000-337395 | 12/2000 |
| JP | 2001-50293 | 2/2001 |
| JP | 2001-193738 | 7/2001 |
| JP | 2001-239944 | 9/2001 |
| JP | 2002-46633 | 2/2002 |
| JP | 2002-286034 | 10/2002 |
| JP | 2002-539033 | 11/2002 |
| SU | 398786 | 9/1973 |
| WO | WO 86/07120 | 12/1986 |
| WO | WO 99/08920 | 2/1999 |
| WO | WO 00/55028 | 9/2000 |
| WO | WO 2004/033270 | 4/2004 |

* cited by examiner

TELESCOPIC SHAFT FOR VEHICLE STEERING

TECHNICAL FIELD

The present invention relates to a telescopic shaft for vehicle steering which is installed in a steering shaft of a vehicle and in which a male shaft and a female shaft are fitted to each other to be mutually unrotatable and slidable.

BACKGROUND ARTS

A telescopic shaft of a steering mechanism of a vehicle is required to have a property of absorbing an axial displacement which is generated when the vehicle is running and of preventing such displacement or vibration from being propagated onto a steering wheel. Further, the telescopic shaft is also required to have a function of moving the position of the steering wheel in the axial direction and of adjusting this position in order to obtain an optimal position for the driver to drive the vehicle.

In any of these cases, the telescopic shaft is required to reduce rattling sound, to decrease backlash feeling on the steering wheel, and to reduce a sliding resistance during a sliding operation in the axial direction.

For such reasons, conventionally, a male shaft of the telescopic shaft is coated with nylon film and grease is applied onto a sliding portion thereof, so as to absorb or mitigate metallic noise, metallic rattle and, at the same time, to reduce a sliding resistance and backlash in the direction of rotation.

However, there is a case that abrasion of the nylon film advances with use and the backlash in the direction of rotation becomes great. Also, under the high-temperature condition inside the engine room, a nylon film is changed in volume, so that a sliding resistance becomes conspicuously great or the abrasion is notably quickened sometimes, and resultantly, the backlash in the direction or rotation may become great in such a case.

On that account, in Japanese Patent Application Laid-Open No. 2001-50293, between at least one pair of axial grooves respectively formed on the outer peripheral surface of a male shaft and on the inner peripheral surface of a female shaft, there is formed rolling elements (spherical members) which are rotated when both shafts are relatively rotated in the axial direction.

Between the axial groove on the male shaft side and the rolling elements (spherical members), a raceway element which is in contact with the rolling elements (spherical member) and an elastic member for preloading the rolling element (spherical member) against the male shaft and the female shaft through this raceway element are interposed.

With this arrangement, since the rolling element (spherical member) is preloaded against the female shaft by the elastic member to the extent that no backlash is generated when torque is not transmitted (at the time of sliding), it is possible to prevent backlash between the male shaft and the female shaft, whereby the male shaft and the female shaft can slide in the axial direction with a stable sliding load without backlash.

Also, since it is arranged such that the rolling element (spherical member) can be retained in the circumferential direction by the elastic member when torque is transmitted, the male shaft and the female shaft can transmit the torque in a state of high rigidity by preventing backlash in the direction or rotation thereof.

However, in Japanese Patent Application Laid-Open No. 2001-50293 described above, since the rolling element (spherical member) is in point contact with the axial groove of the female shaft and the raceway surface element on the male shaft side, there is sometimes generated a dent (or impression) on the surface of the axial groove, or the like, which is in contact with the spherical member if the contact pressure becomes excessively great when the torque load is great. As a result, an increased fluctuation of the sliding load or deteriorated torsional rigidity is brought about.

With an increase of the torsional torque, a lateral slide of the raceway element with respect to the male shaft may be increased so that hysteresis becomes excessively great.

Further, an amount of preloading and the torsional rigidity may be fluctuated due to a manufacturing error (dimensional error) of each of the male shaft, the female shaft, the elastic member, and the raceway surface element.

DISCLOSURE OF THE INVENTION

The present invention has been contrived taking such circumstances as described above into consideration, and an object thereof is to provide a telescopic shaft for vehicle steering which is capable of achieving a stable sliding load and, at the same time, preventing backlash in a direction of rotation, thereby transmitting torque in a state of high rigidity, with the improved durability and with the function of preventing hysteresis from becoming excessively great.

In order to achieve the above object, according to the present invention, there is provided a telescopic shaft for vehicle steering which is installed in a steering shaft of a vehicle and in which a male shaft and a female shaft are fitted to each other to be unrotatable and slidable, characterized in that:

a rolling element for rotating upon relative movement of the both shafts in the axial direction is disposed between at least one pair of grooves which are extended in the axial direction and respectively formed on the outer peripheral surface of the male shaft and on the inner peripheral surface of the female shaft;

a raceway surface element which is in contact with the rolling element and an elastic member for preloading the rolling element against the male shaft and the female shaft through the raceway surface element is interposed between the groove extended in the axial direction on the male shaft side or the female shaft side and the rolling elements; and a sliding member for slidably moving upon relative movement of the both shafts in the axial direction is disposed between at least another one pair of grooves which are extended in the axial direction and respectively formed on the outer peripheral surface of the male shaft and on the inner peripheral surface of the female shaft.

According to the present invention, there is also provided a telescopic shaft for vehicle steering which is installed in a steering shaft of a vehicle and in which a male shaft and a female shaft are fitted to each other to be unrotatable and slidable, characterized in that:

a rolling element for rotating upon relative movement of the both shafts in the axial direction is disposed between at least one pair of grooves which are extended in the axial direction and respectively formed on the outer peripheral surface of the male shaft and on the inner peripheral surface of the female shaft;

a raceway surface element which is in contact with the rolling element and an elastic member for preloading the rolling element against the male shaft and the female shaft through the raceway surface element are interposed between the groove extended in the axial direction on the male shaft side or the female shaft side and the rolling element; and a sliding member for slidably moving upon relative movement of the both shafts in the axial direction is disposed to be concentric with at least the one pair of grooves extended in the axial direction between at least another pair of grooves which are extended in the axial direction and respectively formed on the outer peripheral surface of the male shaft and on the inner peripheral surface of the female shaft.

As described above, according to the telescopic shaft for vehicle steering of the present invention, since a columnar member serving as the sliding member is provided, in addition to a spherical member serving as the rolling element, when great torque is inputted, most of the load amount can be supported by the sliding member (columnar member). As a result, it is possible to improve the durability of the shaft by decreasing the contact pressure between the groove extended in the axial direction of the male shaft or the female shaft, the raceway element, and the rolling element (spherical member). At the same time, it is possible to transmit, when the torque load is great, the torque in a state of high rigidity.

Also, since the sliding member (columnar member) is in contact with the male shaft and the female shaft, it is possible to reduce the torsional torque toward the rolling element (spherical member) and to prevent a lateral slide of the raceway surface element. As a result, it is possible to suppress hysteresis from being excessively great.

As seen from the above description, according to the telescopic shaft for vehicle steering of the present invention described above, it is possible to realize a stable sliding load and, at the same time, to prevent backlash in the direction of rotation without fail, thereby transmitting the torque in a state of high rigidity.

Further, according to the telescopic shaft for vehicle steering of the present invention, it is possible to make the raceway surface element the columnar member which has the central axis thereof in a line with the axial grooves. In this case, since the raceway surface element is the columnar member having the central axis thereof in a line with the axial grooves, several sizes of columnar members can be employed as the raceway surface elements, and a desired preload can be generated by controlling an interference. As a result, it is possible to reduce a fluctuation in the preload and the torsional rigidity which is caused by manufacturing errors (dimensional errors) of the male shaft, the female shaft and the elastic member. It is also possible to achieve lower manufacturing cost by simplifying the form of the raceway surface element.

THE EMBODIMENTS OF THE INVENTION

A telescopic shaft for vehicle steering according to an embodiment of the present invention will be described below with reference to drawings.

(Entire Structure of a Steering Shaft for a Vehicle)

Figure 6:
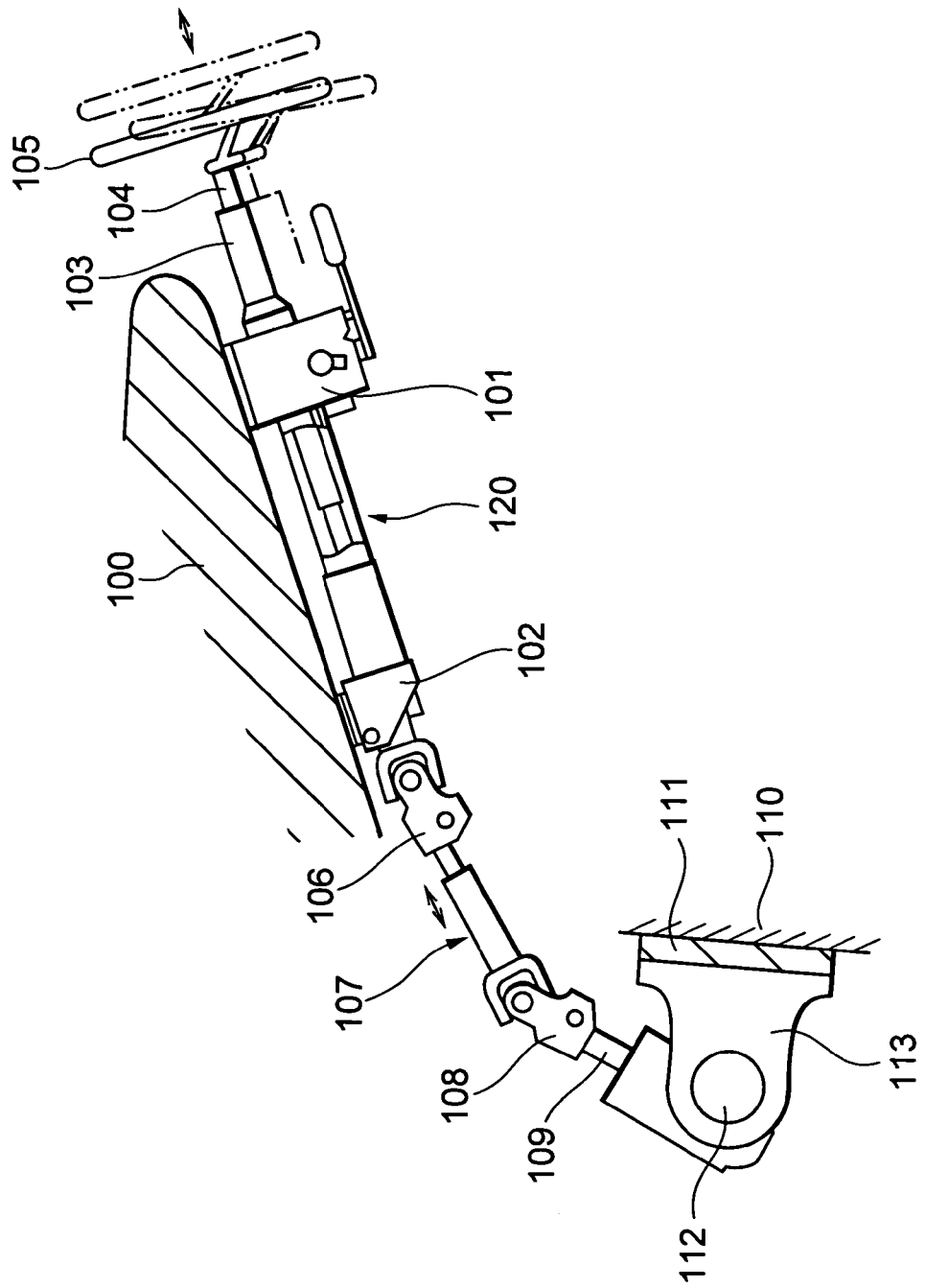
FIG. 6 is a side view of a steering mechanism of a vehicle in which a telescopic shaft for vehicle steering according to an embodiment of the present invention is applied.

FIG. 6 is a side view of a steering mechanism of a vehicle in which a telescopic shaft for vehicle steering according to an embodiment of the present invention is applied.

In FIG. 6, the steering mechanism is constituted by an upper steering shaft portion 120. (including a steering column 103 and a steering shaft 104 retained by the steering column 103 to be rotatable) which is attached to a vehicle body-side member 100 through an upper bracket 101 and a lower bracket 102, a steering wheel 105 which is attached to an upper end of the steering shaft 104, a lower steering shaft portion 107 which is coupled to a lower end of the steering shaft 104 through a universal joint 106, a pinion shaft 109 which is coupled to the lower steering shaft portion 107 through a steering shaft joint 108, a steering rack shaft 112 coupled to the pinion shaft 109, and a steering rack supporting member 113 which supports the steering rack shaft 112 and is fixed to another frame of the vehicle body through an elastic member 111.

In this case, the upper steering shaft portion 120 and the lower steering shaft portion 107 employ a telescopic shaft for vehicle steering according to an embodiment of the present invention (hereinafter called the "telescopic shaft"). The lower steering shaft portion 107 is formed by fitting a male shaft and a female shaft to each other. Such a lower steering shaft portion 107 is required to have the property of absorbing an axial displacement which is generated during the running of the vehicle so as not to transmit the displacement or vibration onto the steering wheel 105. Such a property is required for a structure in which the vehicle body is in a sub-frame structure so that the member 100 for fixing an upper part of the steering mechanism is separately provided from the frame 110 to which the steering rack supporting member 113 is fixed, and the steering rack supporting member 113 is fixed to the frame 110 through the elastic member 111 such as rubber. There is also another case that an extending/contracting function is required for an operator, in order to connect the steering shaft joint 108 to the pinion shaft 109, to once contract the telescopic shaft to be fitted and connected to the pinion shaft 109. Further, though the upper steering shaft 120 which is provided in an upper part of the steering mechanism is also formed by fitting the male shaft and the female shaft to each other, such an upper steering shaft portion 120 is required to have the function of moving the position of the steering wheel 105 in the axial direction and then adjusting the position so as to obtain an optimal position for the driver to drive the vehicle. In all the foregoing cases, the telescopic shaft is required to have a property of reducing rattling sound in the fitting portion, decreasing backlash feeling on the steering wheel 105, and reducing a sliding resistance during sliding movement in the axial direction.

First Embodiment

Figure 1A:
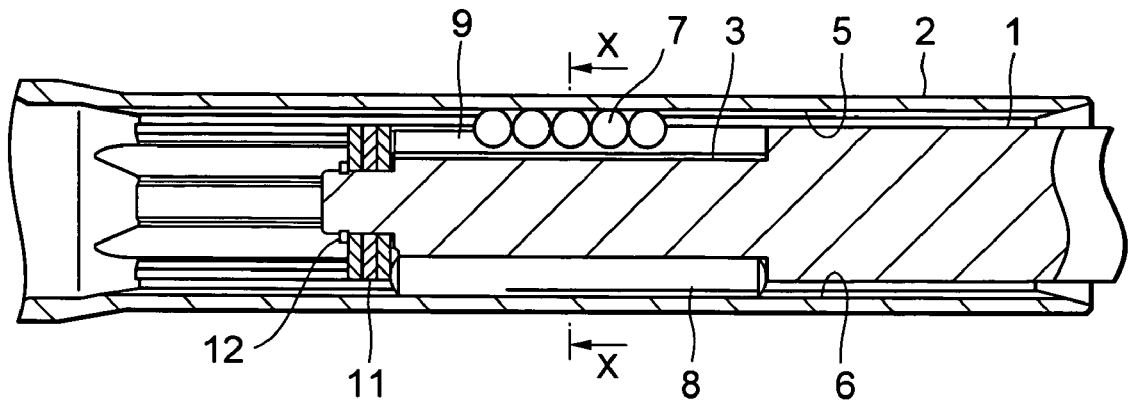
FIG. 1A is a longitudinal cross sectional view of a telescopic shaft for vehicle steering according to a first embodiment of the present invention.
Figure 1B:
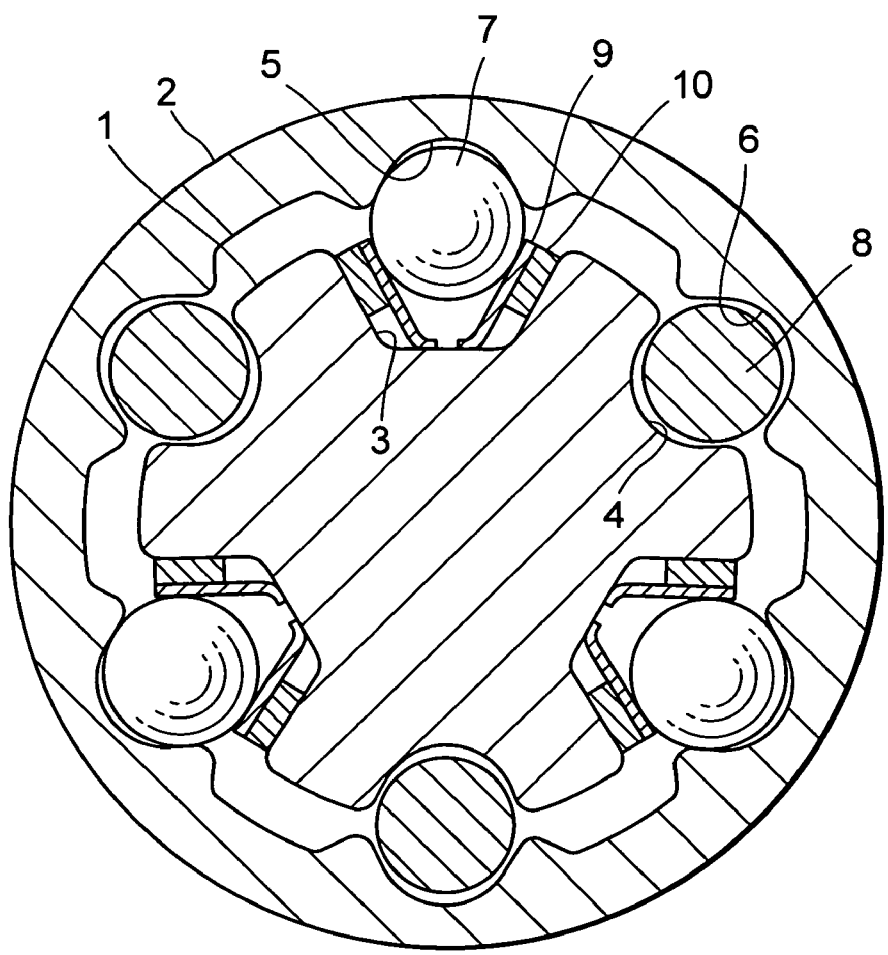
FIG. 1B is a transverse cross sectional view of the telescopic shaft, taken along the line X-X in FIG. 1A.

FIG. 1A is a longitudinal cross sectional view of a telescopic shaft for vehicle steering according to a first embodiment of the present invention, and FIG. 1B is a transverse cross sectional view of the telescopic shaft, taken along the line X-X in FIG. 1A.

As shown in FIG. 1A, the telescopic shaft for vehicle steering (hereinafter called the "telescopic shaft") comprises a male shaft 1 and a female shaft 2 which are fitted to each other to be unrotatable and slidable.

As shown in FIG. 1B, three grooves 3 are provided on the outer peripheral surface of the male shaft 1 at regular intervals of 120° in the circumferential direction to be extended in the axial direction. To be corresponding thereto, on the inner peripheral surface of the female shaft 2, there are provided three grooves 5 which are extended in the axial direction at regular intervals (phase) of 120° in the circumferential direction.

Between the axial grooves 3 of the male shaft 1 and the respective axial grooves 5 of the female shaft 2, a plurality of spherical members 7 (rolling elements) which are rigid bodies for rotating upon relative movement of the male and female shafts 1 and 2 in the axial direction are interposed to be rotatable. Each of the axial grooves 5 has substantially an arch-shaped or Gothic arch-shaped cross section.

Note that the axial groove 3 is constituted by a substantially flat bottom portion and substantially flat side surfaces each having a predetermined angle with respect to the bottom portion. The bottom portion and the side surfaces may have a predetermined angle therebetween or may be at right angles.

Between the axial groove 3 of the male shaft 1 and the spherical members 7, a pair of raceway surface elements 9 which are formed of steel plates to be brought into contact with the spherical members 7 and a pair of elastic members 10 which are formed of rubber or the like for preloading the spherical members 7 against the male shaft 1 and the female shaft 2 through these raceway surface elements 9, respectively, are interposed.

The steel plates for forming the pair of raceway surface elements 9 is separated right and left, and the contact portion between each of the raceway surface elements 9 and the spherical member 7 may be flat or curved, as shown in the drawing. When the contact portion of the raceway surface element 9 is flat, as illustrated in the drawing, it is preferable that the contact portion of the raceway surface element 9 is substantially in parallel to a side surface of the axial groove 3 of the male shaft 1. That is, an angle which is formed by and between the contact portion of the raceway surface element 9 and the bottom portion of the groove 3 and an angle which is formed by and between each side surface of the groove 3 and the bottom portion of the groove 3 is substantially equal to each other.

The pair of elastic members 10 may be separated from each of the corresponding raceway surface elements 9, or may be integrally bonded to the respective raceway surface element 9.

Also, as shown in FIG. 1A, a stopper plate 11 with an elastic member is disposed in an end portion of the male shaft 1, and this stopper plate 11 with the elastic member is fixed by a caulked (or clinched) portion 12. Slip-off of the spherical members 7, the columnar members 8, the raceway surface elements 9 and the elastic members 10 is prevented by the stopper plate with the elastic member.

As shown in FIG. 1B, three axial grooves 4 are provided on the outer peripheral surface of the male shaft 1 at regular intervals of 120° in the circumferential direction. To be corresponding thereto, on the inner peripheral surface of the female shaft 2, there are also provided three axial grooves 6 to be extended at regular intervals of 120° in the circumferential direction.

Between the axial grooves 4 of the male shaft 1 and the corresponding axial grooves 6 of the female shaft 2, a plurality of columnar members 8 (sliding members) which are rigid bodies for slidably moving upon relative movement of the male and female shafts 1 and 2 in the axial direction are interposed to be slidable with very small gap therebetween. Each of the axial grooves 4 and 6 has substantially an arch-shaped or Gothic arch-shaped cross section.

With the telescopic shaft having such a structure as described above, since the spherical members 7 are interposed between the male shaft 1 and the female shaft 2 inclusive of the raceway surface elements 9 and the spherical members 7 are preloaded by the elastic members 10 to the extent that no backlash is generated with respect to the female shaft 2, it is possible to securely prevent backlash between the male shaft 1 and the female shaft 2 when torque is not transmitted. At the same time, the male shaft 1 and the female shaft 2 can slide in the axial direction with a stable sliding load with no backlash when they are moved in the axial direction relatively to each other.

In the present embodiment, when torque is transmitted, the elastic members 10 are elastically deformed to restrain the spherical members 7 in the circumferential direction between the male shaft 1 and the female shaft 2 inclusive of the raceway surface element 9. Meanwhile, the three columnar members 8 interposed between the male shaft 1 and the female shaft 2 mainly discharge the function of transmitting torque.

For example, when torque is inputted from the male shaft 1, since preload of the elastic members 10 is applied in the initial stage, there is generated no backlash and the reaction force against torque is generated by the elastic members 10 to transmit the torque. In this case, the torque transmission as a whole can be performed in a state that the torque transmitted to the female shaft 2 through the raceway surface elements 9 and the input torque from the male shaft 1, the elastic members 10 and the spherical members 7 are in balance.

When the torque is further increased, a gap between the male shaft 1 and the female shaft 2 through the columnar members 8 in the direction of rotation disappears so that the columnar members 8 transmit an incremental portion of the torque subsequent thereto from the male shaft 1 to the female shaft 2. For this reason, it is possible to securely prevent backlash in the direction of rotation between the male shaft 1 and the female shaft 2 and to transmit the torque in a state of high rigidity.

From the above description, according to the present embodiment, since the columnar members 8 are provided in addition to the spherical members 7, most load amount can be supported by the columnar members 8 when great torque is inputted. As a result, it is possible to reduce a contact pressure between the axial grooves 5 of the female shaft 2, the raceway surface elements 9 and the spherical members 7 so as to improve the durability of the shaft, and at the same time, when a torque load is great, to transmit the torque in a state of high rigidity.

Moreover, since the columnar members 8 are in contact with the male shaft 1 and the female shaft 2, it is possible to reduce the torsional torque toward the spherical members 7 and to suppress lateral slide of the raceway surface elements 9. As a result, it is possible to prevent the hysteresis from being excessively great.

As described above, according to the present embodiment, it is possible to realize a stable sliding load and, at the same time, to securely prevent backlash in the direction of rotation, thereby transmit the torque in a state of high rigidity.

Note that the spherical member 7 is preferably a ball of rigid body. It is also preferable that the columnar member 8 of rigid body is a needle roller.

Since the columnar member (hereinafter called the needle roller) 8 receives a load with a line contact, there can be obtained various advantages such that the contact pressure can be lowered, compared with the case with a ball which receives a load with a point contact. As a result, this arrangement is superior in the following points to a case in which all of the arrays are in ball rolling structure.

- The attenuating performance in the sliding portion is great, compared with that in the ball rolling structure. As a result, the vibration absorbing performance is high.
- Since the needle roller is in contact with the male shaft and the female shaft at a small part, a fluctuation in sliding load can be kept low, and a vibration due to this fluctuation is not transmitted to the steering.
- If the same torque is to be transmitted, the contact pressure can be kept lower in the needle roller structure. As a result, the length of the shaft in the axial direction can be reduced so that the space can be used effectively.
- If the same torque is to be transmitted, the contact pressure can be kept lower in the needle roller structure. As a result, there is no longer required an additional process for hardening the surfaces of the axial grooves of the female shaft by thermal treatment or the like.
- The number of constituent parts can be reduced.
- The assembling performance can be improved.
- The assembling cost can be reduced.

As described above, the needle rollers play the essential role for torque transmission between the male shaft 1 and the female shaft 2, and are brought into sliding contact with the inner peripheral surface of the female shaft 2. This structure is superior to the conventional structure which employs spline fitting in the following respects.

- The needle rollers are manufactured in mass production, and can be manufactured at very low cost.
- The needle rollers are polished after being subjected to the thermal treatment, so that they have high surface rigidity and excellent wear resistance.
- Since the needle rollers have been polished, they have fine surface roughness and a low coefficient of friction in a sliding movement. As a result, the sliding load can be kept low.
- Since the length or the layout of the needle rollers can be changed in accordance with the condition of use, the needle rollers can be used in various applications without changing the design concept.
- There is a case in which the coefficient of friction at sliding is required to be further lowered, depending on the condition of use. In such a case, the sliding characteristics can be changed only by subjecting the needle rollers to the surface treatment. As a result, the needle rollers can be used in various applications without changing the design concept.
- Since needle rollers having different outer diameters by several microns can be manufactured at low cost, the gap among the male shaft, the needle rollers, and the female shaft can be minimized by selecting a diameter of the needle rollers. As a result, the rigidity of the shaft in the torsional direction can be improved easily.

Variation of the First Embodiment

Figure 2A:
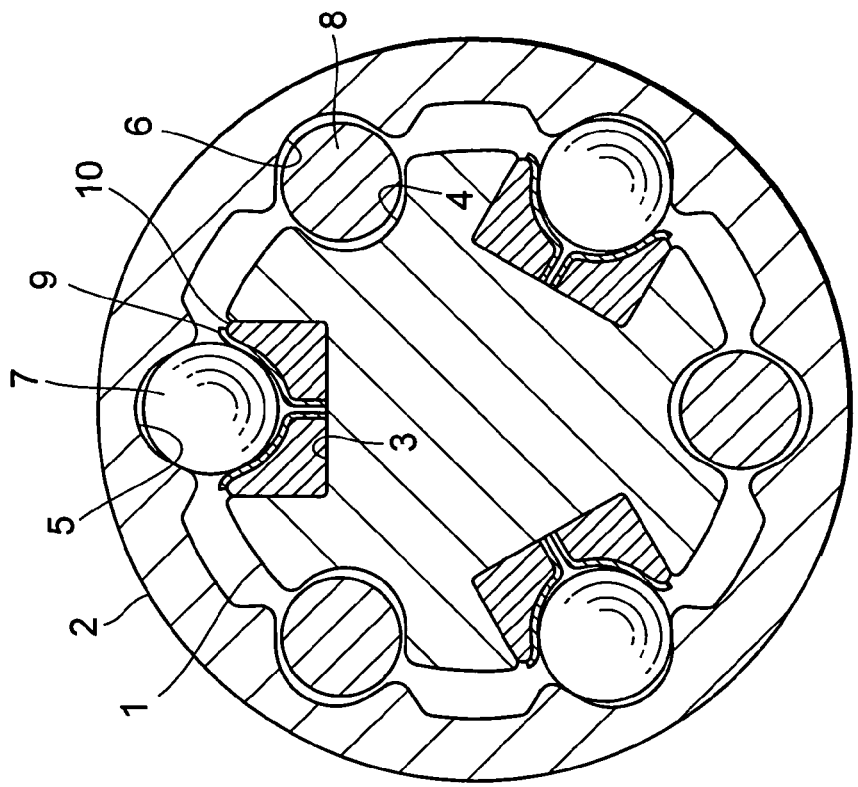
FIG. 2A is a transverse cross sectional view of a telescopic shaft for vehicle steering according to a first variation of the first embodiment of the present invention (corresponding to the transverse cross sectional view, taken along the line X-X in FIG. 1A)

FIG. 2A is a transverse cross sectional view of a telescopic shaft for vehicle steering according to a first variation of the first embodiment of the present invention (corresponding to the transverse cross sectional view, taken along the line X-X in FIG. 1A).

In this variation, a pair of raceway surface elements 9 which are formed of steel plate to be brought into contact with spherical members 7 and a pair of elastic members 10 which are formed of rubber, or the like, for preloading the spherical members 7 against the male shaft 1 and the female shaft 2 through these raceway surface elements 9 are interposed between axial grooves 5 of the female shaft 1 and the spherical members 7. Also in this case, the mode of operation is the same as in the first embodiment described above.

Note that the axial groove 5 is constituted by a substantially flat bottom portion and substantially flat side surfaces each having a predetermined angle with respect to the bottom portion. The bottom portion and the side surface may have a predetermined angle therebetween or may be at right angles.

The steel plates for forming the pair of raceway surface elements 9 are separated right and left, and the contact portion between each of the raceway surface elements 9 and the spherical members 7 may be flat or curved, as shown in the drawing. When the contact portion of the raceway surface element 9 is flat, as illustrated in the drawing, it is preferable that the contact portion of the raceway surface element 9 is substantially in parallel to a side surface of the axial groove 5 of the female shaft 2. That is, an angle which is formed between the contact portion of the raceway surface element 9 and the bottom portion of the groove 5 and an angle which is formed between each side surface of the groove 5 and the bottom portion of the groove 5 are substantially equal to each other.

The pair of elastic members 10 may be separated from the respectively corresponding raceway surface elements 9, or may be integrally bonded to the raceway surface elements 9.

Figure 2B:
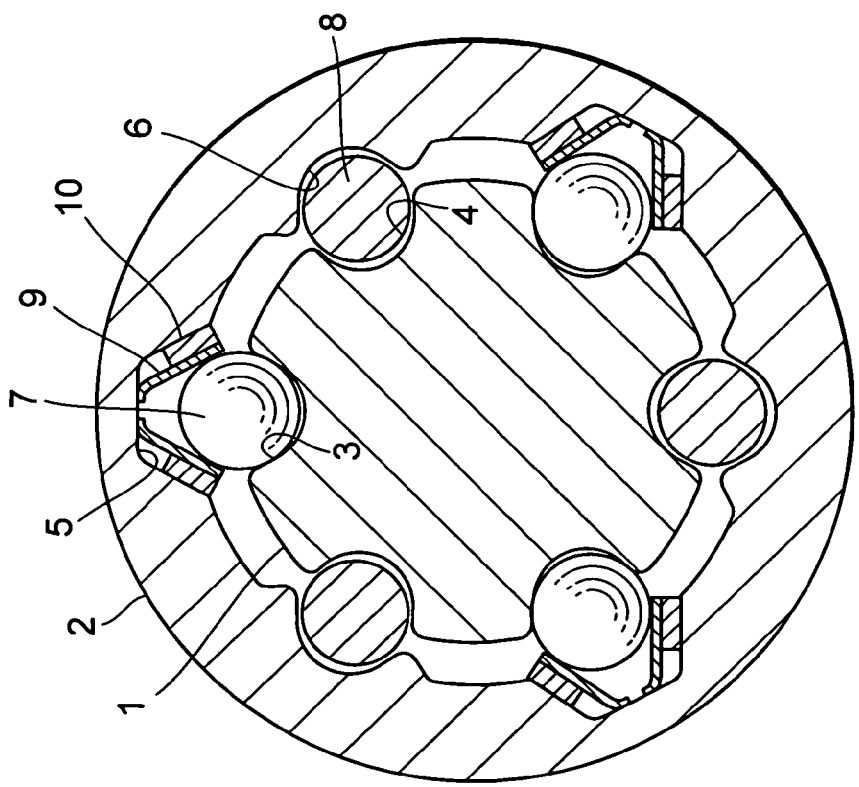
FIG. 2B is a transverse cross sectional view of a telescopic shaft for vehicle steering according to a second variation of the first embodiment of the present invention (corresponding to the transverse cross sectional view, taken along the line X-X in FIG. 1A)

FIG. 2B is a transverse cross sectional view of a telescopic shaft for vehicle steering according to a second variation of the first embodiment of the present invention (corresponding to the transverse cross sectional view, taken along the line X-X in FIG. 1A).

In this variation, the pair of raceway surface elements 9 made of steel plates are formed to be arch-shaped along the curved surfaces of the spherical members 7, while the pair of elastic members 10 are formed to be thicker than those in the first embodiment. Also in this case, the mode of operation is the same as in the first embodiment described above.

The axial groove 3 is constituted by a substantially flat bottom portion and substantially flat side surfaces each having an almost right angle with this bottom portion. The bottom portion and the side surface may be at right angle or may have a predetermined angle therebetween.

The steel plates for forming the paired raceway surface elements 9 are separated right and left, and the contact portion between each of the raceway surface elements 9 and the spherical members 7 may be curved or flat, as shown in the drawing. When the contact portion of the raceway surface element 9 is flat, unlike in the case illustrated in the drawing, it is preferable that the contact portion of the raceway surface element 9 is substantially in parallel to a side surface of the axial groove 3 of the male shaft 1. That is, an angle which is formed by and between the contact portion of the raceway surface element 9 and the bottom portion of the groove 3 and an angle which is formed by and between each side surface of the groove 3 and the bottom portion of the groove 3 are substantially equal to each other.

The pair of elastic members 10 may be separated from the respectively corresponding raceway surface elements 9, or may be integrally bonded to the raceway surface elements 9.

Second Embodiment

Figure 3A:
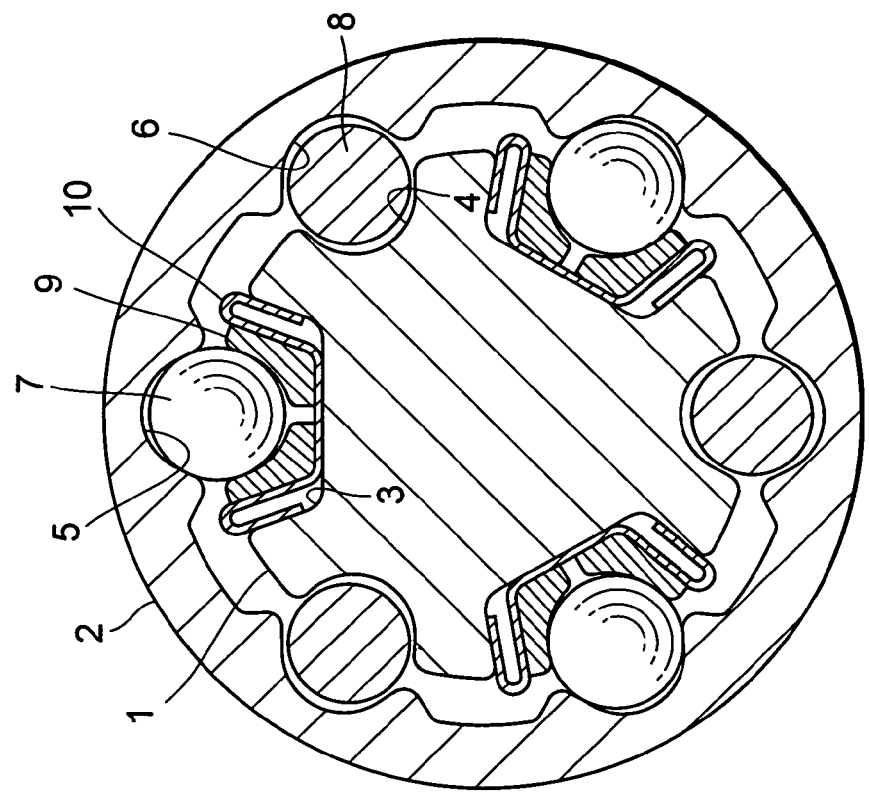
FIG. 3A is a transverse cross sectional view of a telescopic shaft for vehicle steering according to a second embodiment of the present invention (corresponding to the transverse cross sectional view, taken along the line X-X in FIG. 1A)

FIG. 3A is a transverse cross sectional view of a telescopic shaft for vehicle steering according to a second embodiment of the present invention (corresponding to the transverse cross sectional view, taken along the line X-X in FIG. 1A).

In the second embodiment, a pair of raceway surface elements 9 made of needle rollers which are brought into contact with spherical members 7 and a elastic member 10 which is formed of rubber, or the like, for preloading the spherical members 7 against the male shaft 1 and the female shaft 2 through these raceway surface elements 9 is interposed between axial grooves 5 of the female shaft 1 and the spherical members 7. In this case also, the mode of operation is the same as in the first embodiment described above.

Note that the axial groove 5 is constituted by a substantially flat bottom portion and substantially flat side surfaces each having an almost right angle with respect to the bottom portion. The bottom portion and the side surface may have a predetermined angle therebetween or may be at right angle.

Though the elastic member 10 is disposed only on the bottom portion of the axial groove 5 in the illustrated example, it may be disposed up to the side surfaces of the groove 5. One elastic member 10 may be provided singly or two separate ones may be provided to be corresponding to the raceway surface elements 9, respectively.

Since the raceway surface elements in the second embodiment are a pair of needle rollers 9 (columnar members) which are disposed to have the central axes in parallel to the axial grooves 5 to be extended in the axial direction, several sizes of needle rollers 9 can be employed as the raceway surface elements, and a desired preload can be generated by controlling an interference. As a result, it is possible to reduce a fluctuation in the preload and the torsional rigidity caused by manufacturing errors (dimensional errors) of the male shaft 1, the female shaft 2 and the elastic members 10. It is also possible to achieve lower manufacturing cost by simplifying the form of the raceway surface element.

Third Embodiment

Figure 3B:
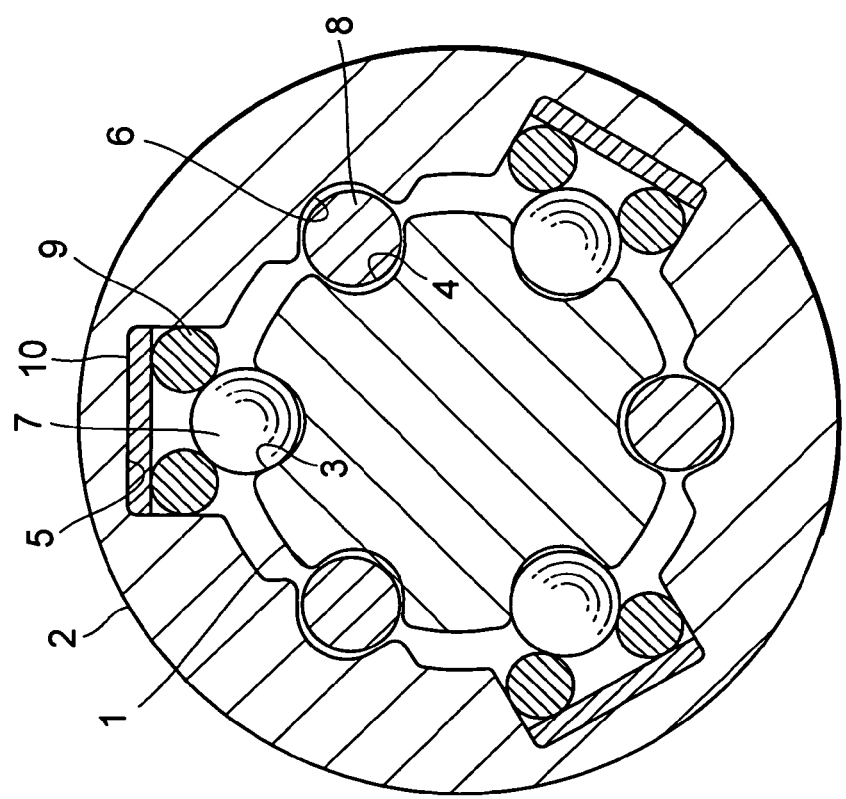
FIG. 3B is a transverse cross sectional view of a telescopic shaft for vehicle steering according to the third embodiment of the present invention (corresponding to the transverse cross sectional view, taken along the line X-X in FIG. 1A)

FIG. 3B is a transverse cross sectional view of a telescopic shaft for vehicle steering according to the third embodiment of the present invention (corresponding to the transverse cross sectional view, taken along the line X-X in FIG. 1A).

In the third embodiment, the raceway surface element 9 is formed of metal to take the form of a guide rail. The elastic member 10 is formed of a leaf spring which is integrally formed to be line symmetrical with both ends thereof folded back. Also in this case, the mode of operation is the same as in the first embodiment described above.

Note that the axial groove 3 is constituted by a substantially flat bottom portion and substantially flat side surfaces each having a predetermined angle with respect to the bottom portion. The bottom portion and the side surface may have a predetermined angle therebetween or may be at right angles.

The paired raceway surface elements 9 are separated right and left, and the contact portion between each of the raceway surface elements 9 and the spherical members 7 may be curved or flat, as shown in the drawing. When the contact portion of the raceway surface element 9 is flat, unlike in the case illustrated in the drawing, it is preferable that the contact portion of the raceway surface element 9 is substantially in parallel to the side surfaces of the axial groove 3 of the male shaft 1. That is, an angle which is formed by and between the contact portion of the raceway surface element 9 and the bottom portion of the groove 3 and an angle which is formed by and between each side surface of the groove 3 and the bottom portion of the groove 3 are substantially equal to each other.

In addition, the elastic member 10 may be comprised of two pieces which are separated to be corresponding to the raceway surface elements 9, respectively.

Fourth Embodiment

Figure 4:
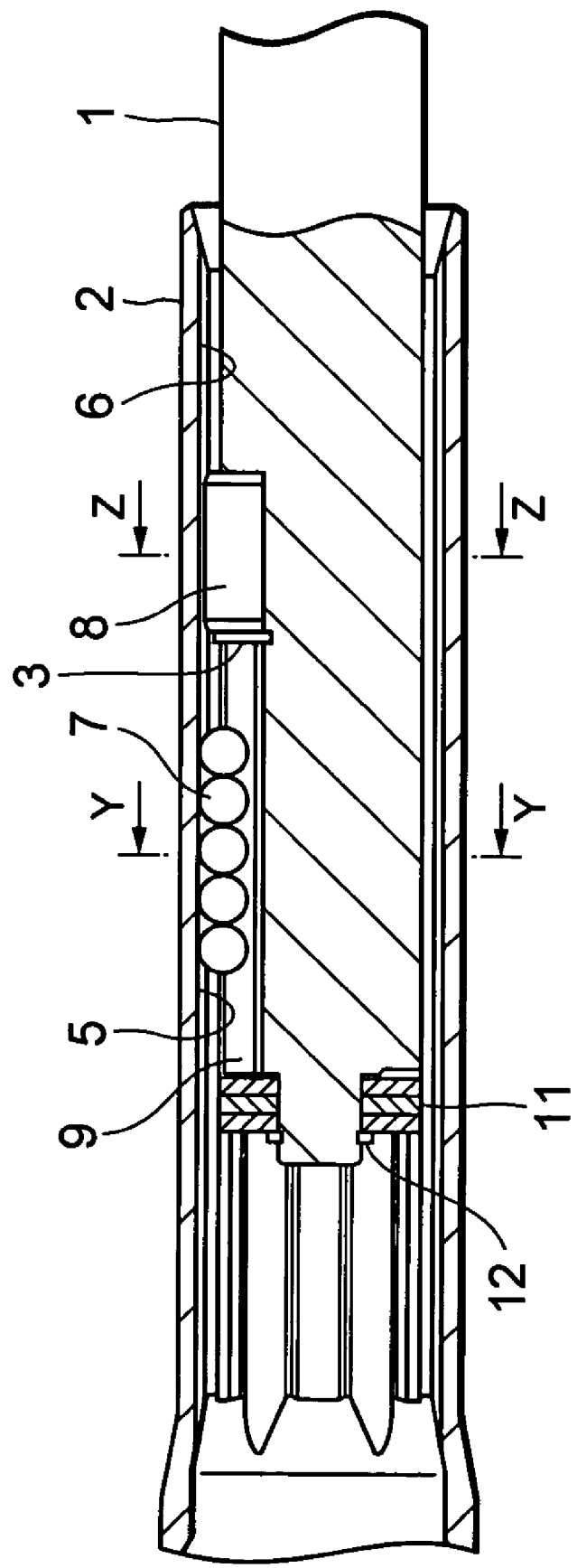
FIG. 4 is a longitudinal cross sectional view of a telescopic shaft for vehicle steering according to a fourth embodiment of the present invention.

FIG. 4 is a longitudinal cross sectional view of a telescopic shaft for vehicle steering according to a fourth embodiment of the present invention.

Figure 5B:
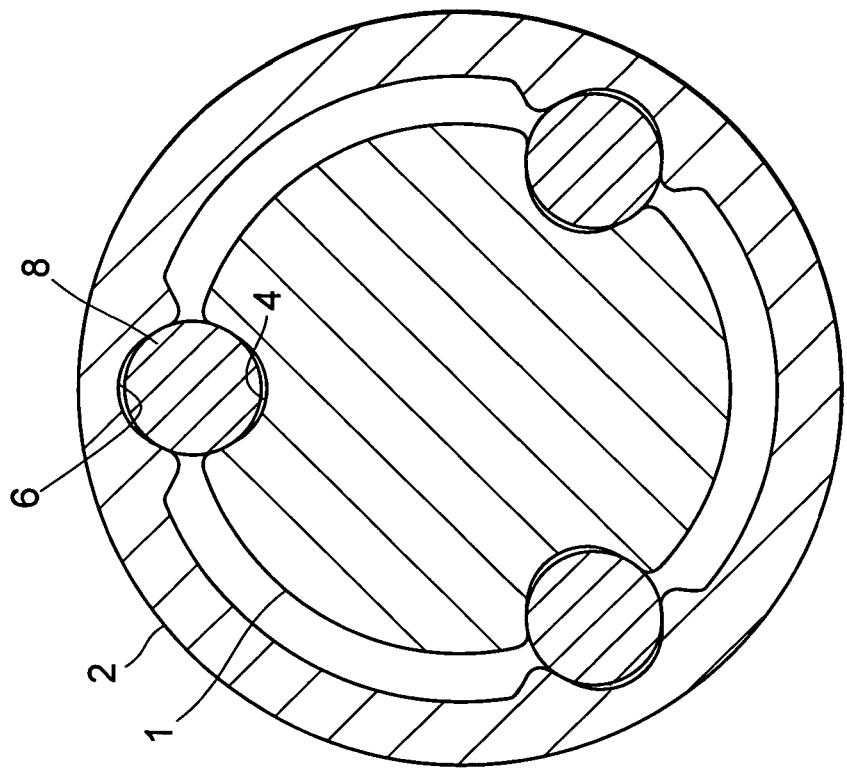
FIG. 5B is a transverse cross sectional view of the telescopic shaft, taken along the line Z-Z in FIG. 4.
Figure 5A:
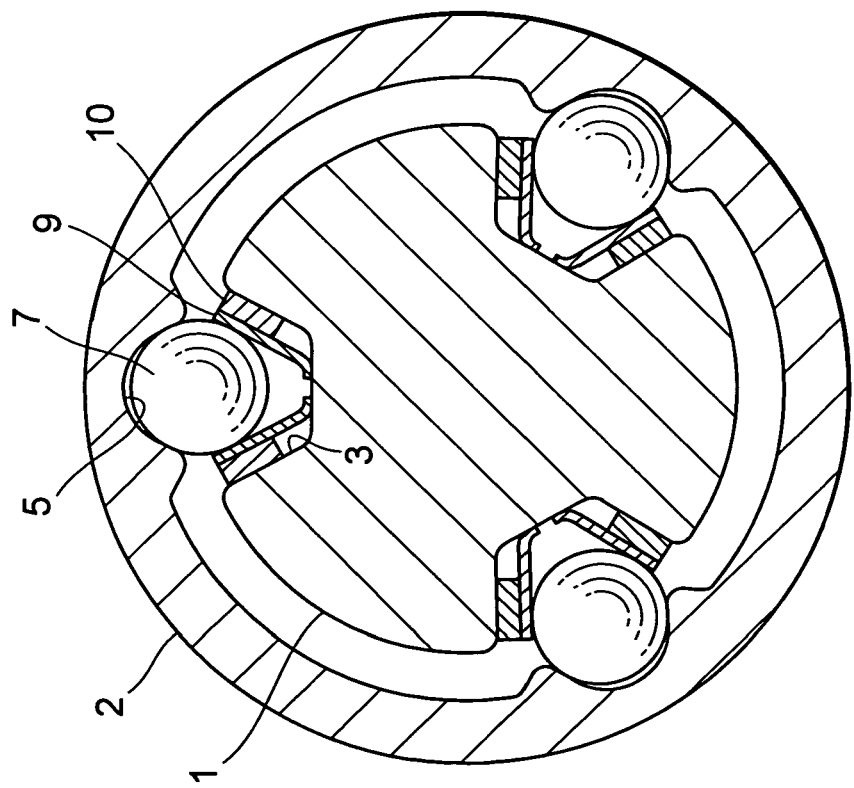
FIG. 5A is a transverse cross sectional view of the telescopic shaft, taken along the line Y-Y in FIG. 4.

FIG. 5A is a transverse cross sectional view of the telescopic shaft, taken along the line Y-Y in FIG. 4, and FIG. 5B is a transverse cross sectional view of the telescopic shaft, taken along the line Z-Z in FIG. 4.

In the present embodiment, as shown in FIG. 5A, three axial grooves 3 are provided to be extended on the outer peripheral surface of the male shaft 1 at regular intervals of 120° in the circumferential direction. To be corresponding thereto, there are provided three axial grooves 5 to be extended on the inner peripheral surface of the female shaft 2 at regular intervals of 120° in the circumferential direction.

Between the axial groove 3 of the male shaft 1 and the axial groove 5 of the female shaft 2, a plurality of spherical members 7 (rolling elements) which are rigid bodies for rotating upon relative movement of the male and female shafts 1 and 2 in the axial direction are interposed to be rotatable.

Between the axial groove 3 of the male shaft 1 and the spherical members 7, a pair of raceway surface elements 9 which are formed of steel plates to be brought into contact with the spherical members 7 and a pair of elastic members 10 which are formed of rubber, or the like, for preloading the spherical members 7 against the male shaft 1 and the female shaft 2 through these raceway surface elements 9 are interposed.

The axial groove 3 is constituted by a substantially flat bottom portion and substantially flat side surfaces each having a predetermined angle with respect to the bottom portion. The bottom portion and the side surface may have a predetermined angle therebetween or may be at right angles.

The steel plates for forming the paired raceway surface elements 9 are separated right and left, and the contact portion between each of the raceway surface elements 9 and the spherical members 7 may be curved or flat, as shown in the drawing. When the contact portion of the raceway surface element 9 is flat, as illustrated in the drawing, it is preferable that the contact portion of the raceway surface element 9 is substantially in parallel to the side surface of the axial groove 3 of the male shaft 1. That is, it is preferable that an angle which is formed by and between the contact portion of the raceway surface element 9 and the bottom portion of the groove 3 and an angle which is formed by and between each side surface of the groove 3 and the bottom portion of the groove 3 are substantially equal to each other.

The pair of elastic members 10 may be separated from the respectively corresponding raceway surface elements 9, or may be integrally bonded to the respective raceway surface elements 9.

As shown in FIG. 4, a stopper plate 11 with an elastic member is disposed in an end portion of the male shaft 1, and this stopper plate 11 with the elastic member 11 is fixed to an end portion of the male shaft 1 by a caulked (or clinched) portion 12. Slip-off of the spherical members 7, the raceway surface elements 9 an the elastic members 10 is prevented by this stopper plate with the elastic member.

Further, in the present embodiment, as shown in FIG. 5B, a plurality of columnar members 8 (sliding members) which are formed of rigid bodies and slide during a relative movement of both shafts 1 and 2 in the axial direction are interposed to be slidable between the axial grooves 4 and 6 which are formed concentrically with the axial grooves 3 and 5 described above.

The axial groove 3 is comprised of a bottom portion and side surfaces each having a predetermined angle. Each of the axial grooves 5 has substantially an arch-shaped or Gothic arch-shaped cross section, and each of the axial grooves 4 and 6 has substantially an arch-shaped or Gothic arch-shaped cross section.

Accordingly, the axial grooves 5 and the axial grooves 6 are concentric with each other and have substantially the same forms. On the other hand, the axial grooves 3 and the axial grooves 4 are, though being concentric with each other, different in form.

As shown in FIG. 4, there is provided a stopper plate 13 with an elastic member between the row of spherical members 7 and the columnar member 8. Interference between the spherical members 7 and the columnar member 8 is prevented by this stopper plate 13 with the elastic member.

As seen from the above description, according to the present embodiment, since there are provided the columnar members 8 in addition to the spherical members 7, the load amount can be supported mostly by the columnar members 8 when great torque is inputted. As a result, it is possible to improve the durability of the shaft by reducing a contact pressure between the axial grooves 5 of the female shaft 2, the raceway elements 9 and the spherical members 7. At the same time, it is possible to transmit the torque in a state of high rigidity when the torque load is great.

Also, since the columnar members 8 are in contact with the male shaft 1 and the female shaft 2, it is possible to reduce the torsional torque to the spherical members 7 so as to suppress a lateral slide of the raceway surface elements 9. As a result, it is possible to prevent the hysteresis from being excessively great.

As described above, according to the present embodiment, it is possible to realize a stable sliding load and to securely prevent backlash in the direction of rotation, whereby the torque can be transmitted in a state of high rigidity.

It should be noted that the present invention is not limited to the foregoing embodiments, but can be altered in various manners.

As described above, according to the present invention, since there are provided the sliding members (columnar members) in addition to the rolling elements (spherical members), the load amount can be supported mostly by the sliding members (columnar members) when great torque is inputted. As a result, it is possible to improve the durability of the shaft by reducing a contact pressure between the axial grooves of the male shaft or the female shaft, the raceway elements and the rolling elements (spherical members). At the same time, it is possible to transmit the torque in a state of high rigidity when the torque load is great.

Also, since the sliding members (columnar members) are in contact with the male shaft and the female shaft, it is possible to reduce the torsional torque to the rolling members (spherical members) so as to suppress a lateral slide of the raceway surface elements. As a result, it is possible to prevent the hysteresis from being excessively great.

As described above, according to the present invention, it is possible to realize a stable sliding load and to securely prevent backlash in the direction of rotation, whereby the torque can be transmitted in a state of high rigidity.

What is claimed is:

1. A telescopic shaft for vehicle steering which is installed in a steering shaft of a vehicle and in which a male shaft and a female shaft are fitted to each other for relative telescopic movement and for torque transmission therebetween, characterized in that:

rolling elements, which rotate in response to relative telescopic movement between the male and female shafts, are disposed between at least one first pair of axially extending grooves, the first pair of grooves being formed respectively on an outer peripheral surface of said male shaft and on an inner peripheral surface of said female shaft;

a pair of raceway surface elements is interposed between said rolling elements and said male shaft or said female shaft in the corresponding first pair of grooves, said pair of raceway surface elements being disposed side by side in a circumferential direction of said telescopic shaft and each being in contact with said rolling elements and an elastic member for preloading said rolling elements against one of said male and female shafts through said pair of raceway surface elements; and at least one columnar member, which slides in response to relative telescopic movement between the male and female shafts, is received, with a small gap, in grooves of at least one second pair of axially extending grooves formed respectively on the outer peripheral surface of said male shaft and on the inner peripheral surface of said female shaft.

2. A telescopic shaft for vehicle steering according to claim 1, wherein each of said pair of raceway surface elements is a columnar member, which has a central axis parallel to the corresponding first pair of grooves.

3. A telescopic shaft for vehicle steering according to claim 1, wherein each of said pair of raceway surface elements is formed from a steel plate.

4. A telescopic shaft for vehicle steering which is installed in a steering shaft of a vehicle and in which a male shaft and a female shaft are fitted to each other for relative telescopic movement and for torque transmission therebetween, characterized in that:

rolling elements, which rotate in response to relative telescopic movement between the male and female shafts, are disposed between at least one first pair of axially extending grooves, the first pair of grooves being formed respectively on an outer peripheral surface of said male shaft and on an inner peripheral surface of said female shaft;

a pair of raceway surface elements is interposed between said rolling elements and said male shaft or said female shaft in the corresponding first pair of grooves, said pair of raceway surface elements being disposed side by side in a circumferential direction of said telescopic shaft and each being in contact with said rolling elements and an elastic member for preloading said rolling elements against one of said male and female shafts through said pair of raceway surface elements; and at least one columnar member, which slides in response to relative telescopic movement between the male and female shafts, is received, with a small gap, in grooves of at least one second pair of axially extending grooves formed respectively on the outer peripheral surface of said male shaft and on the inner peripheral surface of said female shaft with at least one of said second pair of grooves being coaxial with one of said first pair of grooves.

5. A telescopic shaft for vehicle steering according to claim 4, wherein each of said pair of raceway surface elements is a columnar member, which has a central axis parallel to the corresponding first pair of grooves.

6. A telescopic shaft for vehicle steering according to claim 4, wherein each of said pair of raceway surface elements is formed from a steel plate.

* * * * *